June 24, 1952 — A. STARTS — 2,601,342
MOUNTING FOR INTERNAL-COMBUSTION ENGINES
Filed April 19, 1949 — 4 Sheets-Sheet 1

INVENTOR.
Albert Starts
BY Banning & Banning
Attys.

June 24, 1952    A. STARTS    2,601,342
MOUNTING FOR INTERNAL-COMBUSTION ENGINES
Filed April 19, 1949    4 Sheets-Sheet 2

INVENTOR.
Albert Starts
BY
Banning & Banning
Attys.

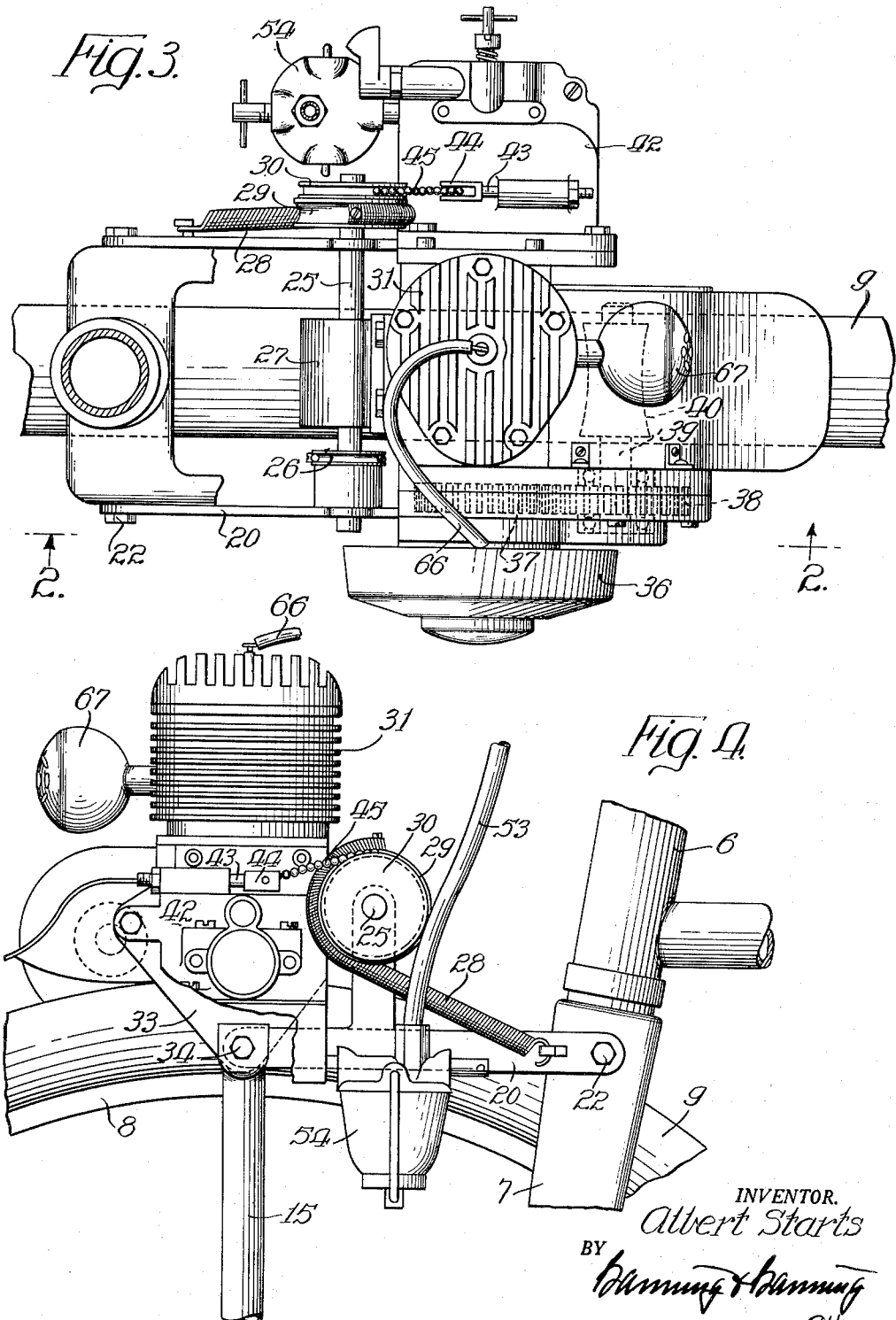

June 24, 1952      A. STARTS      2,601,342

MOUNTING FOR INTERNAL-COMBUSTION ENGINES

Filed April 19, 1949      4 Sheets-Sheet 4

INVENTOR.
Albert Starts

Patented June 24, 1952

2,601,342

UNITED STATES PATENT OFFICE 2,601,342

MOUNTING FOR INTERNAL-COMBUSTION ENGINES

Albert Starts, Fort Lauderdale, Fla., assignor, by mesne assignments, to Camfield Manufacturing Company, Grand Haven, Mich., a corporation of Michigan Application April 19, 1949, Serial No. 88,349

13 Claims. (Cl. 180—33)

This invention relates to a mounting for an internal combustion engine which is specially designed for the propulsion of a bicycle. It is also concerned with means associated with such a mounting whereby the engine speed and its driving connection with the bicycle may be controlled.

The engine herein disclosed is desirably very small and light. It is equipped with a driven shaft on which is mounted a friction wheel. This shaft is disposed parallel with the crank shaft of the engine, and laterally thereof, so that when the engine is moved from one position to another, the friction wheel will be brought into engagement with the tire on one of the bicycle wheels which is to be driven thereby.

It is desirable that the mounting for such an engine be very simple and lend itself to facile installation. Such a mounting is herein disclosed, and means is provided in connection therewith for supporting the engine in either of two positions, in one of which it may idle freely without engaging with the tired wheel, and in the other of which it is advanced into driving engagement therewith.

Another object of the invention is to provide a simplified control by which movements of the engine to and from driving position may be effected; and also to combine with such a control a connection to the carburetor throttle valve so that the engine speed may be varied, as desired. The present control embodies also certain other distinctive features of advantage as will hereinafter appear.

In the description to follow, I have shown the engine mounted at the forward end of a bicycle over its front wheel. This is one place where it may be used successfully. It may also be mounted to engage with the rear wheel with little or no substantial change. Also the mounting is shown to be pivotal whereby the engine may tilt about a fixed axis. While this is a preferred way, it should be understood that the important thing is to provide for movement of the engine through a fixed path whereby the friction wheel of the engine will be advanced into and out of driving engagement with one of the tired wheels of the bicycle to effect propulsion thereof.

With these preliminary observations and general statements of the purposes and objects of this invention, I will proceed now to a detailed description thereof, as per the embodiment illustrated in the accompanying drawings wherein:

Fig. 3 is a to plan view, looking along line 3—3 of Fig. 2;

Fig. 4 is an elevational view of the engine side which is opposite that appearing in Fig. 2.

Figure 1:
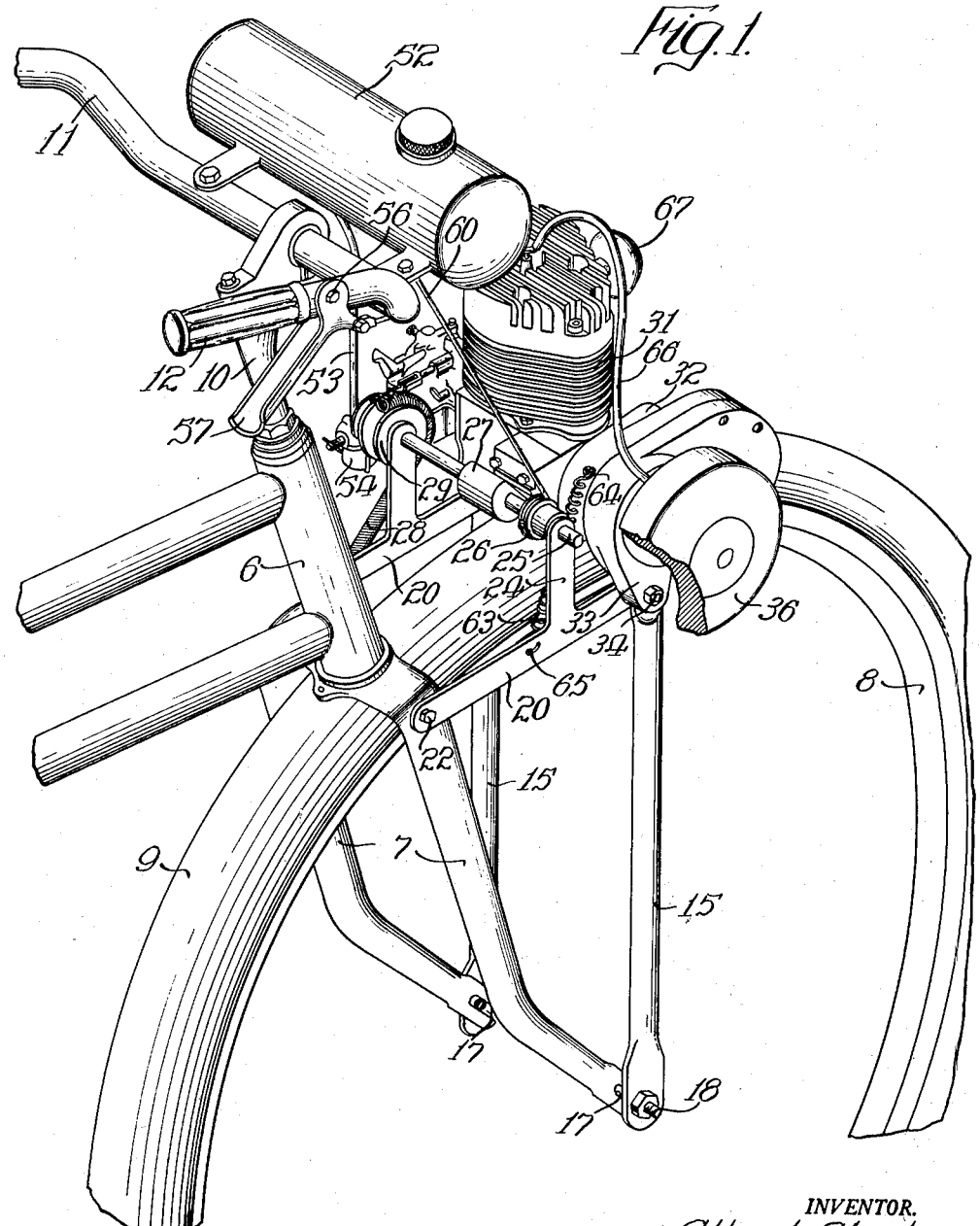
Figure 1 is a view in perspective looking toward the engine from one side and the rear thereof and showing its operative position in relation to the driven front wheel when mounted upon the frame of a bicycle.

The bicycle frame includes at the front a tubular head 6 through which is extended the usual post upstanding from the forks 7 which support between them a front wheel 8 which carries around its rim a tire 9. Into the upper end of the post is anchored the depending stem 10 of a handle having oppositely extending bars 11 with grips 12 carried at the end portions thereof. The frame parts thus far described may be entirely conventional, wherefore further details need not be given.

The present engine mounting may be conveniently and expeditiously applied to the frame of a bicycle having structural parts such as those just enumerated. The mounting comprises a pair of brackets each provided by a vertically disposed strut 15 having near its lower end a hole positioned in register with a slot 17 at the lower end of the adjacent fork 7; through each registering hole and slot may be extended one end portion of the wheel axle bolt 18 about whose axis the bicycle front wheel is rotatably mounted. Each bracket includes also a horizontal arm 20 joined integrally or otherwise with the upper end of one of the struts 15, the arm being extended rearwardly to a point at the side of the proximate fork 7 to which it is clamped or affixed as at 22. By the construction just described, each bracket is maintained in a fixed position where it is supported from below upon the axle bolt of the front wheel of the bicycle.

Figure 5:
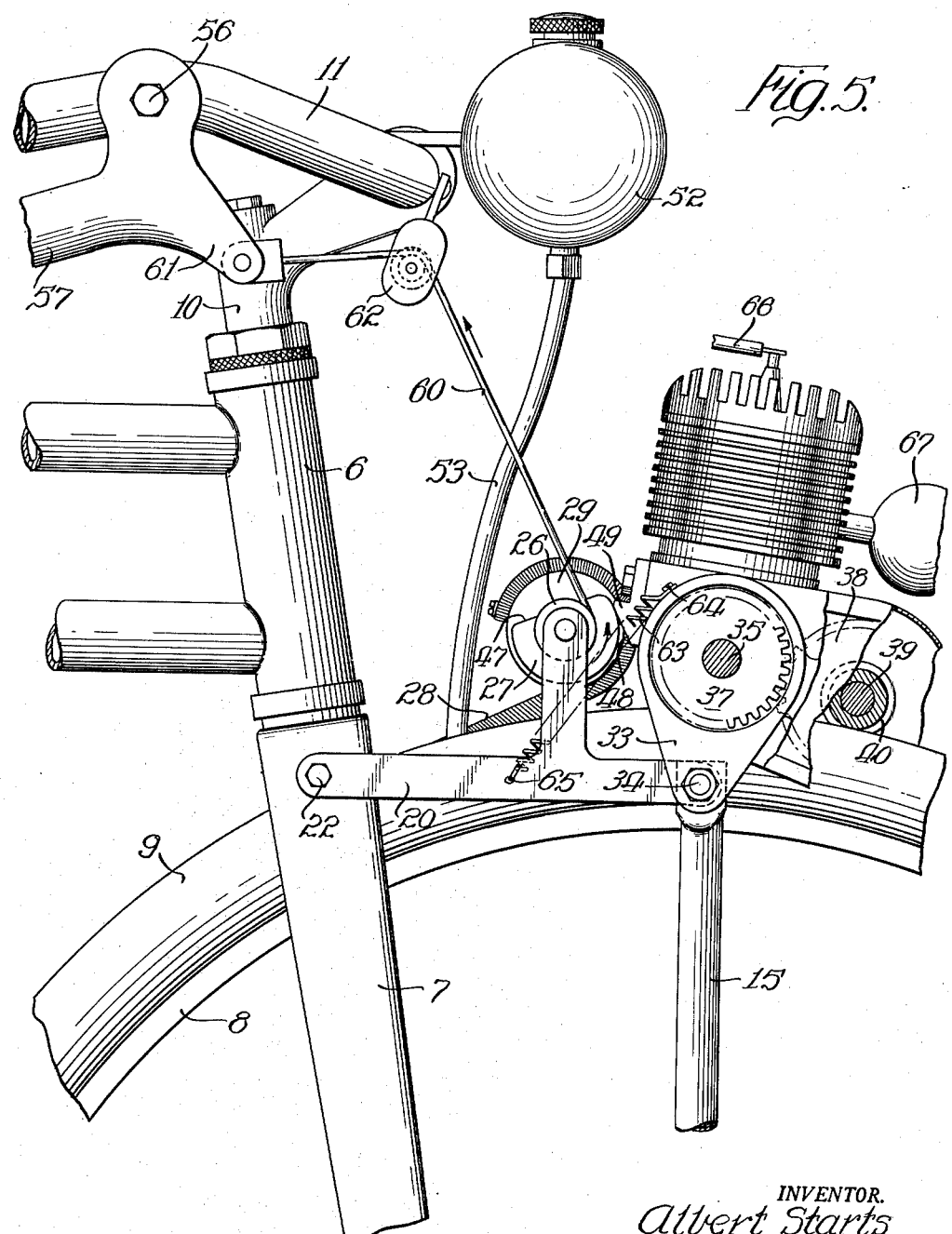
Fig. 5 which is a view similar to Fig. 2 shows the engine tilted forwardly on its mounting to establish a frictional driving connection with the front wheel of the bicycle.

Upstanding from each arm at opposite medial points is a post 24 in whose upper end is a mounting wherein a rock shaft 25 is journaled. This shaft extends between the two posts and therebeyond to provide a cross connection therebetween. Carried fast on the shaft near one end thereof is a pulley 26 and, in a medial position thereon, a cam roller 27. A tension spring 28 is also anchored to a pulley 29 carried fast upon the shaft, the spring being wound over the pulley and extended therefrom for connection with the mounting bracket at a point adjacent the rear end of one of the arms 20. A torsional force is thereby exerted tending to rotate the shaft 25 clockwise as viewed in Figs. 1, 2, and 5. A second pulley 30 is also mounted fast on the shaft for a purpose which will be explained at a later point.

The engine for which the present mounting is specially designed is air-cooled with the assistance of fins extended upon the sides and head of its cylinder 31 which upstands from a crank case 32 having at each of its opposite ends a depending lug 33 formed with a hole to receive a bolt 34 which, in the case of separate bracket parts, may also provide the connection between one strut 15 and its associated arm 20. Since the two bolts 34 are aligned, it follows that the engine support which they provide is pivoted so as to permit the engine to rock or tilt forwardly or rearwardly. The engine shaft 35 which carries a fly wheel 36 at one end mounts a gear 37 in mesh with a gear 38 that is carried on a driven shaft 39 which also mounts a friction wheel 40 lying directly forwardly of the engine and centrally between the two spaced brackets (see Fig. 3). The engine crank case, or an extension thereof, also provides suitable bearings for the shafts 35 and 39 and an enclosure for the gears 37 and 38 and the friction wheel 40 except only its lower portion which is exposed for driving engagement with the tire 9 of the front wheel 8 when the engine is tilted forwardly for the purpose.

At the engine end opposite its fly wheel and adjacent its base is mounted a carburetor 42 whose throttle valve may be urged to an idling position by spring means (not shown). Opening of this valve is accomplished by a control stem 43 having its exposed end equipped with a fitting 44 to which one end of a chain 45 may be readily connected. This chain leads to the pulley 30 where it is attached so as to be wound thereupon whenever the rock shaft 25 is rotated. For this purpose the cam roller 27 is provided with a chord face 47 for coacting with the acting face 48 of a thrust block 49 that is affixed to the engine base at a medial point (see Figs. 2 and 5). In the normal rest position of the rock shaft 25 the chord face 47 is substantially opposite the acting face 48 of the block so as to be free, or substantially so, of engagement therewith; but in the operated position of the rock shaft the body of the cam roller will have been rotated into engagement with the thrust block.

In reaching this operated position, the cam roller is required to tilt the engine forwardly about the axis of the two bolts 34, and in so doing the friction wheel 40 is advanced downwardly into engagement with the tire 9 of the wheel 8. The extent of this tilting movement is determined by the difference in the distances between the axis of the rock shaft 25 and the curved peripheral portion of the cam roller on the one hand and its chord face 47 on the other hand. During the initial stage of rotative movement of the cam roller the engine is tilted forwardly an increasing distance, but in the succeeding stage of movement, when the curved surface of the cam has come into engagement with the acting face 48 of the thrust block, the engine will remain stationary in its advanced position while the rock shaft 25 is free to continue on with its rotative movement. In both stages of the shaft rotative movement, the chain 45 continues to be wound further upon the pulley 30, thereby to further open the throttle valve of the carburetor.

The handle bars of the bicycle furnish a mounting for a fuel tank 52 from which a fuel conduit 53 leads to a sediment bulb 54 in connection with the carburetor. It also provides a mounting for the single control that is necessary for operation of the engine. This consists of a bell crank lever pivoted at 56 to one of the handle bars adjacent its grip 12 so that one arm 57 of the lever is movable toward the grip from below; and a cord 60 or flexible wire extending from the other arm 61 of the bell crank lever through a pulley 62 and downwardly to the rock shaft 25 for connection with the pulley 26. The finger of the rider's hand resting on the grip 12 may readily pull up the lever arm 57 to thereby pull upon the cord 60 to rotate the rock shaft against the tension of the spring 28. In so doing the cam roller produces a forward tilting movement of the engine upon its pivotal mounting and concurrently initiates an opening movement of the carburetor valve which continues as long as the arm 57 of the bell crank advances upwardly toward the grip 12.

Figure 2:
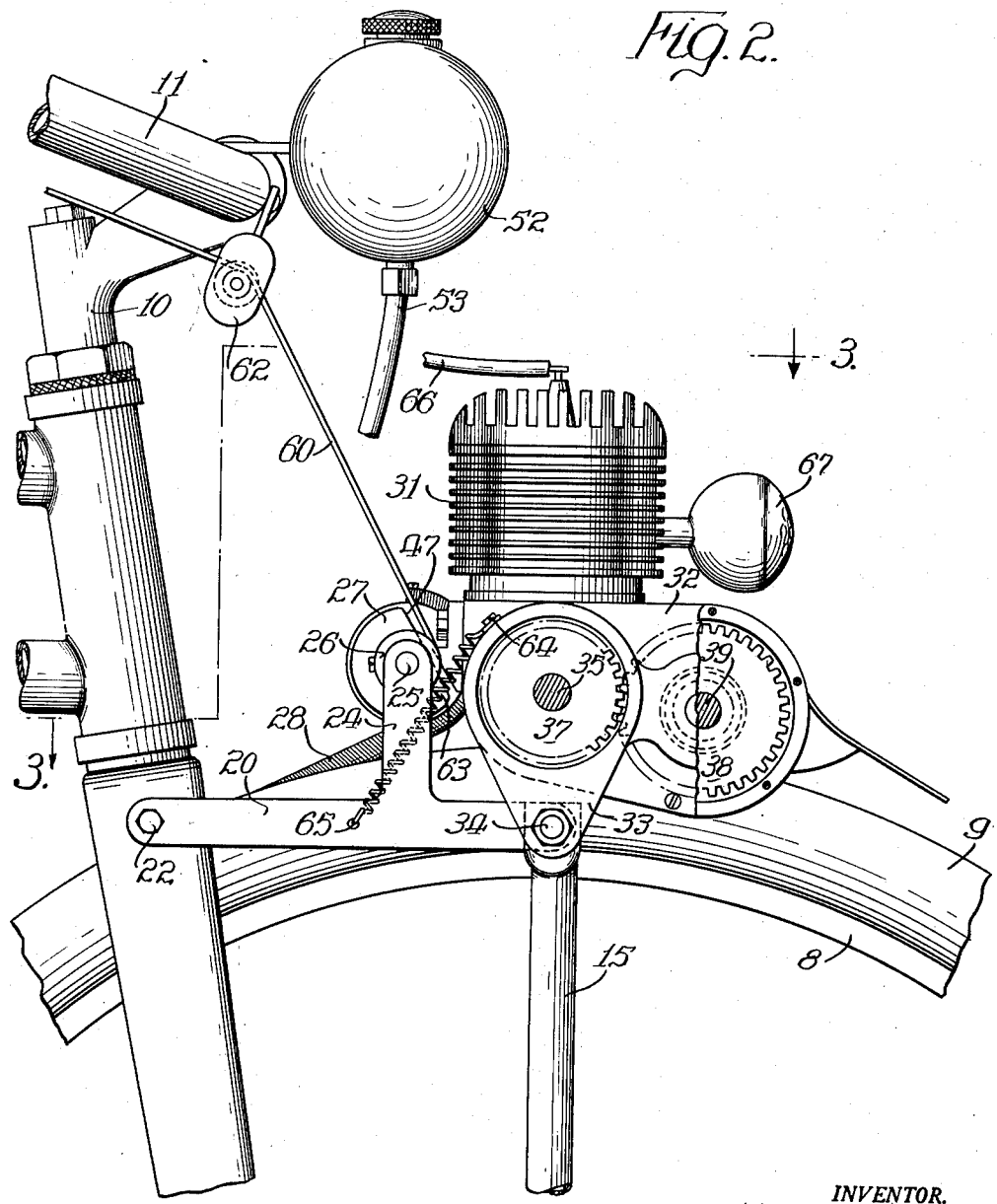
Fig. 2 is a view in elevation, looking along line 2—2 of Fig. 3.

With an engine mounting of the kind described, release of the lever 57 will permit restoration of the engine to the vertical position of Fig. 2 in which the friction wheel is out of contact with the wheel tire. This rearward tilting movement of the engine to a non-driving position may be accomplished by appropriate tension means such as a spring 63 whose opposite ends are secured to the engine at 64 and to the bracket at 65. In its upright position the engine is free to operate idly at the minimum speed which is fixed by the idling adjustment (not shown). Starting of the engine is most easily performed by pedaling of the bicycle until a speed of say 5 M. P. H. has been attained. At about this point the lever 57 is pulled up to tilt the engine forwardly, thereby producing engagement between the moving bicycle wheel 8 and friction wheel 40. In consequence, motion will be transmitted to the engine whereby to draw into its cylinder a charge of combustible fuel which is thereupon compressed and ignited, thereby to initiate operation of the engine under its own power which is transmitted back through the friction wheel to the wheel of the bicycle to effect propulsion thereof. As already explained, the extent of pull-up movement imparted to the lever 57 will determine the degree to which the carburetor throttle valve is opened and this, in turn, controls the speed of the engine and the power delivered therefrom.

The drawings show an ignition cable 66 leading from a spark plug at the cylinder head to a magneto or generator which may be built into the fly wheel 36, also a muffler 67 at the cylinder front. These are details which may be varied considerably, and since they are foreign to the present invention which is concerned primarily with the mounting and control for the engine, no further description of them need be given. Attention is especially directed to the simplicity of the control by which (1) the engine is advanced to a position of engagement or disengagement relative to the wheel of the associated bicycle, and (2) the engine speed is stepped up progressively from and after the moment that this advancing movement once starts in a forward direction. This progressive increase in engine speed proceeds through two stages, the first being from the at-rest position of the engine where it idles at minimum speed to the point where the friction wheel is in driving engagement with the bicycle wheel; the second stage extends through the continued further opening movement of the throttle valve. During the first stage of this opening movement, the increase in engine speed proceeds more rapidly than during the second stage due to the fact that the engine whereon the carburetor is mounted is then moving away from the rock shaft 25 which carries the pulley 30 in connection with the throttle valve. This performance characteristic of the engine is desirable inasmuch as it assures a sufficient pick-up in engine speed by the time a driving connection with the bicycle wheel has been established to provide adequate power for propulsion of the bicycle.

The power transmission from the engine to the tired bicycle wheel embodies a feature which is both advantageous and novel. This is the arrangement whereby the friction wheel is located medially of the engine crank shaft, laterally thereof, and mounted to rotate about an axis that is parallel therewith. With the engine pivotally supported upon spaced lugs depending at opposite ends thereof, this medial positioning of the friction wheel places it between the lugs and centrally lengthwise of the wheel axle. As a result, there is a balanced relationship between the center of the friction wheel and the two pivot points whereon the engine is supported; in this symmetrical relationship there is also included the thrust block 49 which is disposed oppositely of the friction wheel (see Fig. 5) so that pressure applied to the block normally thereof is transmitted in substantially a straight line to and from the friction wheel to the wheel tire centrally thereof.

I claim:

1. The combination wtih a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine carried by said mounting and movable between two positions in one only of which the friction wheel is advanced into driving engagement with the tired wheel to effect propulsion of the bicycle, and a motion-transmitting control device carried by the bicycle frame and including a manually actuated rotatable cam affixed to a rotatable cam shaft and having a chord face arranged to advance the engine on its mounting to the position where there is driving engagement between its friction wheel and the bicycle wheel tire, means connected for rotation with the cam shaft and operatively connected to the carburetor valve, said cam being also provided with a peripheral edge concentric with the axis of the cam and arranged to maintain the friction wheel in constant uniform pressure contact with the tire during further movement of the cam to increase the speed of engine operation.

2. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine pivotally mounted below the crank case on said mounting and tiltable forwardly and backwardly between two positions in one only of which the friction wheel is advanced into driving engagement with the tired wheel to effect propulsion of the bicycle, and a motion-transmitting control device including a manually actuated rotatable cam affixed to a rotatable cam shaft and having a chord face arranged to tilt the engine on its mounting to the position where there is driving engagement between its friction wheel and the bicycle tire, means connected for rotation with the cam shaft and operatively connected to the carburetor valve, said cam being also provided with a peripheral portion concentric with its axis and arranged to maintain the friction wheel in constant uniform pressure contact with the tire during further movement of the cam to increase the speed of engine operation.

3. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine pivoted below the crank case on said mounting and tiltable between two positions in only one of which the friction wheel is advanced into driving engagement with the tired wheel to effect propulsion of the bicycle, said engine having a driven shaft located at one side of the engine shaft and carrying the friction wheel, and a motion-transmitting control device including a rock shaft located at the opposite side of the engine shaft, and a cam fixedly mounted on the rock shaft to rotate therewith and arranged to tilt the engine on its mounting to the position where there is driving engagement between the friction wheel and the bicycle wheel tire, means connected for rotation with the rock shaft and operatively connected to the carburetor valve, said friction wheel and cam being located opposite each other and with said engine shaft located substantially medially with relation to the friction wheel and cam.

4. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine pivoted below the crank case on said mounting and tiltable between two positions in only one of which the friction wheel is advanced into driving engagement with the tired wheel to effect propulsion of the bicycle, said engine having a driven shaft located at one side of the engine shaft and carrying the friction wheel, and a motion-transmitting control device in operative connection with the carburetor valve and comprising a rock shaft located at the opposite side of the engine shaft, and a cam fixedly mounted on the rock shaft to rotate therewith and having a chord face arranged to actuate the engine to advance the same on its mounting to the position where there is driving engagement between its friction wheel and the bicycle tire, said cam being also provided with a peripheral portion concentric with its axis and arranged to maintain the friction wheel in constant uniform pressure contact with the tire during further movement of the cam to increase the speed of engine operation.

5. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine pivoted below the crank case on said mounting and tiltable between two positions in only one of which the friction wheel is advanced into driving engagement with the tired wheel to effect propulsion of the bicycle, said engine having a driven shaft located at one side of the engine shaft and carrying the friction wheel, and a motion-transmitting control device in operative connection with the carburetor valve and comprising a rock shaft located at the opposite side of the engine shaft, and a cam fixedly mounted on the rock shaft to rotate therewith and having a chord face arranged to actuate the engine to advance the same on its mounting to the position where there is driving engagement between its friction wheel and the bicycle tire, said cam being also provided with a peripheral portoin concentric with its axis and arranged to maintain the friction wheel in constant uniform pressure contact with the tire during further movement of the cam to increase the speed of engine operation, said friction wheel and cam being arranged opposite each other and with said engine shaft located substantially medially with relation to the friction wheel and rock shaft.

6. The combination with a bicycle which has a tired wheel rotatable about an axle bolt to support a frame, an internal combustion engine equipped with a valve-controlled carburetor, a pair of spaced lugs depending below the engine crank case, and a friction wheel supported for movement with said engine for engagement with the wheel tire to effect propulsion of the bicycle, of an engine mounting on the bicycle frame comprising a pair of like brackets each affixed to the axle bolt and extending upwardly along opposite sides of the wheel to a point near its top with means extending laterally for connection with the bicycle frame, aligned pivotal connections between the two brackets and the depending lugs of the engine to provide a support whereon the engine may be rocked between two positions in which the friction wheel is in driving engagement and disengagement, respectively, with the tired wheel, and a motion-transmitting control device comprising a cam affixed to a rotatable rock shaft and operable to rock the engine to the position in which the friction wheel is in driving engagement with the tire, means connected for rotation with said cam shaft and operatively connected to the carburetor valve, said cam being provided with a peripheral portion concentric with the axis of the cam and arranged to maintain the friction wheel is continuous uniform pressure contact with the tire during further movement of the cam and when the motion-transmitting control device is operated to increase the speed of engine operation.

7. A propulsion mechanism for bicycles including an internal combustion engine equipped with a valve-controlled carburetor and with a friction wheel supported for movement therewith adapted for engagement with a bicycle wheel tire, a mounting adapted to be attached to a bicycle having a frame, said engine being mounted on said mounting and movable between two positions in one only of which the friction wheel is advanced to a driving position, and a motion-transmitting control device carried by said mounting, said control device including a manually actuated element in operative connection with the carburetor valve and having means to actuate the engine on the mounting for movement to said driving position and having additional means engaging the engine when in its driving position maintaining said friction wheel in substantially constant relation to said mounting during further movement of said element to increase the speed of engine operation.

8. A propulsion mechanism for bicycles including an internal combustion engine equipped with a valve-controlled carburetor and a friction wheel supported for movement therewith adapted for engagement with a bicycle wheel tire, a mounting adapted to be carried by a bicycle frame, said engine being pivotally supported on said mounting about a point below the crank case and being tiltable forwardly and backwardly between two positions in one only of which the friction wheel is advanced to its driving position, and a motion-transmitting control device carried by said mounting, said control device including an element in operative connection with the carburetor valve and having means to tilt the engine on its mounting to said one position where said friction wheel is in its driving position and having additional means for maintaining the friction wheel in substantially constant relation to said mounting during further movement of said element to increase the speed of engine operation.

9. A propulsion mechanism for bicycles including an internal combustion engine equipped with a valve-controlled carburetor and with a friction wheel supported for movement therewith adapted for engagement with a bicycle wheel tire, a mounting adapted to be attached to a bicycle, said engine pivoted below the crank case on said mounting and tiltable between two positions in only one of which the friction wheel is advanced to a driving position, said engine having a driven shaft located at one side of the engine shaft and carrying said friction wheel, and a motion-transmitting control device in operative connection with the carburetor valve and comprising a rock shaft located at the opposite side of the engine shaft, and a cam fixedly mounted on the rock shaft to rotate therewith and having a chord face arranged to actuate the engine to advance the same on its mounting to the position where the friction wheel is in its driving position, said cam being also provided with a peripheral portion concentric with its axis and arranged to maintain the friction wheel in substantially constant relation to said mounting during further movement of the cam to increase the speed of engine operation.

10. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine mounted on said mounting and movable between two positions in one only of which the friction wheel is advanced into driving engagement with the tired wheel to effect propulsion of the bicycle, and a motion-transmitting control device carried by the mounting and including a manually actuated element in operative connection with the carburetor valve and having first means to actuate the engine on its mounting to the position where there is driving engagement between its friction wheel and the bicycle wheel tire and having additional means maintaining the friction wheel in constant uniform pressure contact with the bicycle wheel tire when said additional means is in its actuated position.

11. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine mounted on said mounting and movable between two positions in one only of which the friction wheel is advanced into driving engagement with the tired wheel to effect propulsion of the bicycle, and a motion-transmitting control device carried by the bicycle frame and including a manually actuated element in operative connection with the carburetor valve and having means to actuate the engine on its mounting to the position where there is driving engagement between its friction wheel and the bicycle wheel tire and having additional means engaging the engine for maintaining the friction wheel in constant uniform pressure contact with the tire during further movement of said element to increase the speed of engine operation.

12. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine pivotally mounted below the crank case on said mounting and tiltable forwardly and backwardly between two positions in one only of which the friction wheel is advanced into driving engagement with the tired wheel to effect propulsion of the bicycle, and a motion-transmitting control device carried by the bicycle frame and including an element in operative connection with the carburetor valve and having means to tilt the engine on its mounting to the position where there is driving engagement between its friction wheel and the bicycle wheel tire and having additional means for maintaining the friction wheel in constant uniform pressure engagement with the tire during further movement of said element to increase the speed of engine operation.

13. The combination with a bicycle having a tired wheel supporting a frame and an internal combustion engine equipped with a valve-controlled carburetor and with a friction wheel supported for movement therewith for engagement with the wheel tire to effect propulsion of the bicycle, of a mounting on the bicycle frame, said engine pivotally mounted below the crank case on said mounting and tiltable forwardly and backwardly between two positions in one only of which the friction wheel is advanced into driving engagement with the tired wheel to effect propulsion of the bicycle, and a motion-transmitting control device carried by the bicycle frame and including an element in operative connection with the carburetor valve and having means to tilt the engine on its mounting to the position where there is driving engagement between its friction wheel and the bicycle wheel tire and having additional means for maintaining the friction wheel in constant uniform pressure engagement with the tire during further movement of said element to increase the speed of engine operation, the combined movements of the tilting engine and said element operating to move the carburetor control valve to a further open position.

ALBERT STARTS.

REFERENCES CITED

The following references are of record in the file of this patent:

UNITED STATES PATENTS

| Number | Name | Date |
| --- | --- | --- |
| 688,838 | Dorsey | Dec. 17, 1901 |
| 1,115,120 | Smith | Oct. 27, 1914 |
| 1,719,718 | Moore | July 2, 1929 |

FOREIGN PATENTS

| Number | Country | Date |
| --- | --- | --- |
| 13,017 | Great Britain | 1915 |
| 53,604 | Denmark | Sept. 13, 1937 |